United States Patent [19]
Suzuki et al.

[11] Patent Number: 5,724,941
[45] Date of Patent: Mar. 10, 1998

[54] MALFUNCTION DIAGNOSIS DEVICE OF AN INTERNAL COMBUSTION ENGINE CONTROLLER

[75] Inventors: Hideki Suzuki, Chita-gun; Yoshiyuki Okamoto, Anjou-city, both of Japan

[73] Assignee: Nippondenso Co., Ltd., Kariya-city, Japan

[21] Appl. No.: 593,722

[22] Filed: Jan. 29, 1996

[30] Foreign Application Priority Data

Jan. 30, 1995 [JP] Japan ................... 7-12623

[51] Int. Cl.⁶ ............... F02D 41/22; F02D 43/00; B60H 1/32
[52] U.S. Cl. ............... 123/339.15; 123/41.15; 62/129; 62/133; 290/40 A
[58] Field of Search ............ 123/339.15, 41.15, 123/41.11, 41.12; 62/129, 133, 323.4; 290/40 A; 73/117.3, 118.1

[56] References Cited

U.S. PATENT DOCUMENTS

| | | | |
|---|---|---|---|
| 4,960,087 | 10/1990 | Junginger et al. | 123/339.15 |
| 5,167,127 | 12/1992 | Ohtsu | 62/133 |
| 5,172,561 | 12/1992 | Hanson et al. | 62/127 |
| 5,347,824 | 9/1994 | Kato et al. | 62/323.6 |

FOREIGN PATENT DOCUMENTS

| | | |
|---|---|---|
| 4-31648 | 2/1992 | Japan. |
| 5-99018 | 4/1993 | Japan. |

*Primary Examiner*—Andrew M. Dolinar
*Attorney, Agent, or Firm*—Cushman Darby & Cushman; IP Group of Pillsbury; Madison & Sutro LLP

[57] ABSTRACT

An air conditioner control unit performs air conditioner malfunction detection when it detects idle control malfunctions no less than three times in the engine control unit. For example, it detects whether an evaporator downstream temperature is within a second predetermined range which is computed based on a theoretical value. If such temperature is not within the second predetermined range, the air conditioner control unit determines that there is a malfunction in the air conditioner. Moreover, if it is determined that there is a malfunction in the air conditioner, the air conditioner control unit determines if such malfunction affects emissions or fuel consumption. Then, based on the result of such determination, the engine control unit executes malfunction display.

21 Claims, 9 Drawing Sheets

MALFUNCTION DIAGNOSIS DEVICE OF AN INTERNAL COMBUSTION ENGINE CONTROLLER

CROSS-REFERENCE TO RELATED APPLICATION

This application is related to and claims priority from Japanese Patent Application No. Hei-7-12623, the contents of which are hereby incorporated by reference.

BACKGROUND OF THE INVENTION

1. Field of the Invention

The present invention relates to a malfunction detector of an internal combustion engine controller.

2. Description of Related Art

One conventional malfunction detection device for a controller which controls an operational state of an internal combustion engine is a device according to Japanese Patent Laid-Open Publication No. Hei-4-31648 which performs a malfunction detection of an idle speed control (hereinafter referred to as ISC) auxiliary valve.

This device includes an idle-up auxiliary valve, which is in parallel with the ISC valve and which supplies air to an engine, and opens the idle-up auxiliary valve when a vehicular indoor air conditioner compressor is in operation. This device detects malfunction in the auxiliary valve by relying on a characteristic that when the volume of air supplied from the auxiliary valve increases, ISC valve control amount declines compared to when the compressor is not in operation. In short, a malfunction in the auxiliary valve is determined when the control amount of the ISC valve during compressor operation is bigger than the control amount during compressor non-operation by more than a predetermined amount.

However, the device of the above patent publication does not perform malfunction diagnosis on devices such as a vehicular indoor air conditioner compressor and an electric power generating alternator whose malfunctions cause the same amount of deterioration in the emission and in the fuel consumption as the malfunction of the internal combustion engine controller.

For example, during the operational malfunction of the air conditioner compressor (despite manipulating the compressor into a non-operative state, the compressor has the malfunction in which it continues operating because the magnetic clutch is not operatively released which is probably caused by a malfunction in a driving unit inside an ECU or a malfunction in the electric power unit of the magnet clutch), $NO_x$ emissions double and fuel consumption deteriorates 1.3 times at a special cruising mode.

Moreover, when there is an operational malfunction in the air conditioner compressor, because an ISC valve closed malfunction is determined when engine speed deteriorates, checks and repairs at a repair shop will take time.

SUMMARY OF THE INVENTION

In view of the foregoing problems of the prior art in mind, it is a goal of the present invention to provide a low-cost malfunction detector which uses simple control to detect malfunction in various auxiliary devices and which varies malfunction display methods in accordance with effects such as malfunctions which cause deterioration of emission and fuel consumption, malfunctions which affect comfort and the like so that a driver easily recognizes the extent and location of the vehicular function malfunction.

To achieve this goal, one aspect of the present invention aims to provide a malfunction diagnosis device of an internal combustion engine controller which includes an operational parameter detection unit for detecting an internal combustion engine operational parameter, an intake air volume manipulation unit for increasing and decreasing an internal combustion engine inlet air volume, an idle speed control unit for making an internal combustion engine actual speed converge to a target speed by adjusting the intake air volume manipulation unit based on a deviation between the internal combustion engine actual speed and the target speed during an internal combustion engine idle operating state, an auxiliary device driven by internal combustion engine power, an auxiliary device operational state detection unit for detecting an auxiliary device operational parameter, an auxiliary device malfunction determination unit for determining that the auxiliary device has a malfunction when the internal combustion engine operational parameter is out of a first predetermined range and the auxiliary device operational parameter is out of a second predetermined range, a malfunction degree detection unit for determining if the auxiliary device malfunction is a malfunction which aggravates emissions, fuel consumption or the like after the auxiliary device malfunction determination unit determines the auxiliary device malfunction, and a malfunction display unit for displaying a malfunction in accordance with a malfunction condition determined by the malfunction degree detection unit.

In this way, in the present invention, by employing the above construction, the operational parameter detection unit detects the operational parameter of the internal combustion engine. The intake air volume manipulation unit increases and decreases intake air volume to the internal combustion engine while the idle speed control unit adjusts the intake air volume unit and makes the actual speed of the internal combustion engine converge to the target speed based on a difference between the actual speed and the target speed during an idle operation of the internal combustion engine.

The auxiliary device is powered by the internal combustion engine while the auxiliary device operational state detection unit detects the operational parameter of the auxiliary device. During idle speed control, the auxiliary device malfunction determination unit determines that there is a malfunction in the auxiliary device when the operational parameter of the internal combustion engine is out of a first predetermined range and when the functional parameter of the auxiliary device is out of a second predetermined range. When the auxiliary device malfunction determination unit determines that there is a malfunction in the auxiliary unit, the malfunction degree detection unit determines if the malfunction of the auxiliary device is a malfunction which makes the emission and fuel consumption deteriorate.

Furthermore, the malfunction display unit displays the malfunction in accordance with the state of malfunction determined by the malfunction degree determination unit.

Thus, with the present invention, malfunctions in the auxiliary units which have been detected only through evident phenomena such as deterioration of vehicular drivability and vehicular cruising difficulty can now be detected early and through slighter deteriorations in emissions and fuel consumption than in conventional systems.

Moreover, during inspections and repairs at repair shops, because there is a clear indication of whether the malfunction is in the engine control system or the auxiliary device, work efficiency improves and erroneous replacement of faulty components can be prevented.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are described hereinafter with reference to the accompanying drawings.

Figure 1:
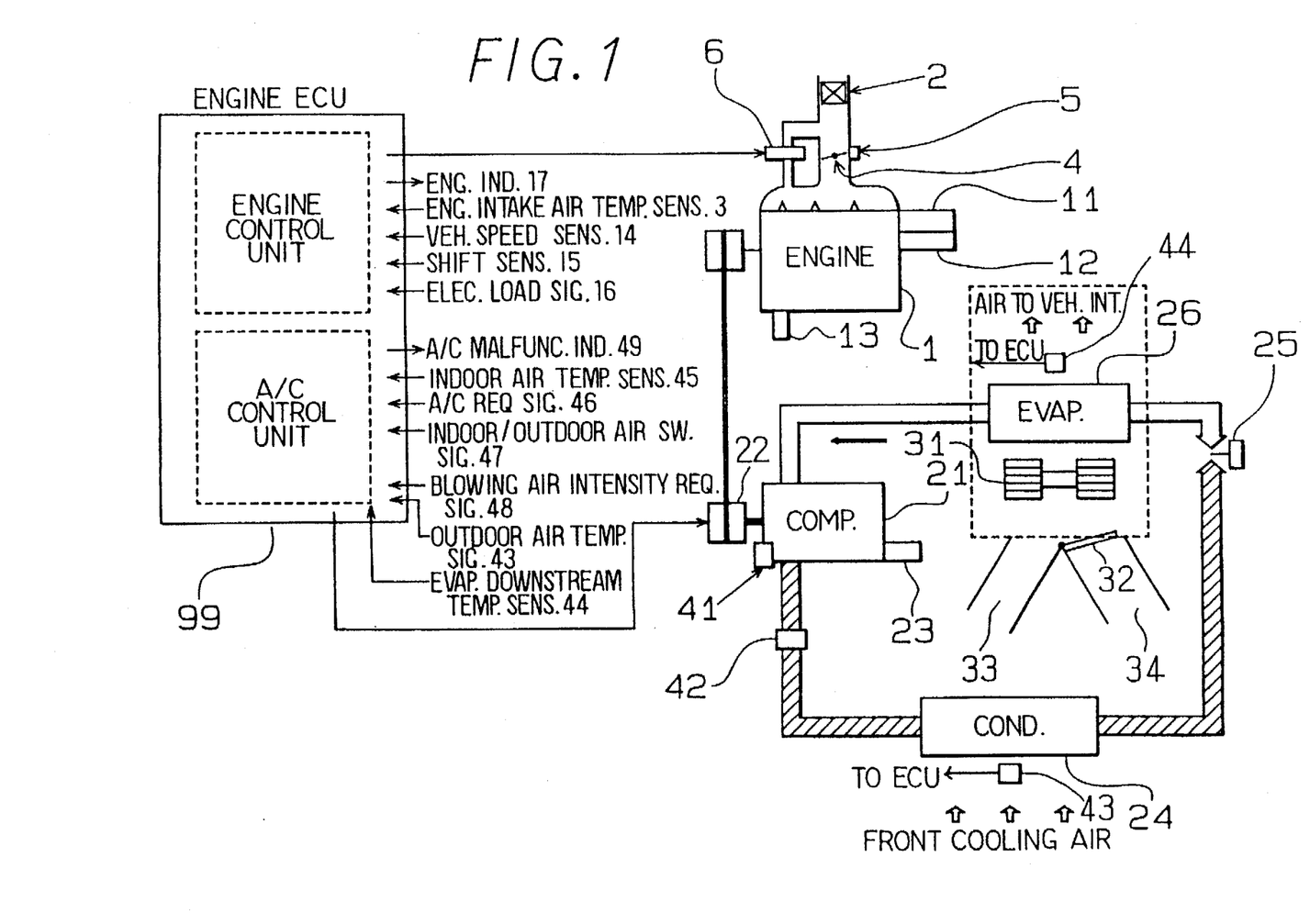
FIG. 1 is a system block diagram of a first embodiment of the present invention.

FIG. 1 shows a construction of a first embodiment.

An intake air system of a four-cylinder internal combustion engine 1 includes an air flow meter 2 for measuring intake air volume from an intake air upstream, an intake air temperature sensor 3 (not shown) mounted inside the air flow meter 2 for measuring intake air temperature, a throttle valve 4 for controlling intake air volume, a throttle sensor 5 for measuring throttle valve aperture, and an ISC valve 6 for controlling intake air volume that bypassed the throttle valve 4 to adjust engine idle speed.

An operational status detection system includes a rotation angle sensor 11 for detecting engine speed, a cylinder determination sensor 12 for distinguishing cylinders, a coolant temperature sensor 13 for detecting engine temperature, a vehicular speed sensor 14 (not shown) mounted on driving wheels for detecting vehicular speed, a shift position signal 15 (not shown) for detecting a cruising mode of an automatic transmission, and an electric load signal 16 (not shown) for detecting an increase in electric load such as lights.

These detection signals are received by an engine control computer (hereinafter referred to as engine ECU) 99.

A coolant circulatory system of a vehicular indoor air conditioner includes a compressor 21 which compresses a coolant, a magnetic clutch 22 which controls actuation and deactuation of the compressor 21, a valve 23 which switches compression capacity, a condenser 24 which cools the coolant, an expansion valve 25 which adjusts an amount of coolant to be sent to an evaporator 26, and evaporator 26 which cools air using latent heat of the coolant.

An air conditioner driving system includes a blower motor 31 for blowing air and an indoor/outdoor air switching valve 32 for switching between an indoor air circulation duct 33 and an outdoor air introduction duct 34.

As an operation detection system, the engine ECU 99 is provided with a compressor rotation sensor 41, a coolant pressure sensor 42, an outdoor air temperature sensor 43, an evaporator downstream temperature sensor 44, a vehicular indoor temperature sensor 45 (not shown), an air conditioner request signal 46 manipulated by a driver, an indoor air circulation/outdoor air introduction request signal 47, and an air blow intensity request signal 48.

It must be noted here that the ISC valve 6, the magnetic clutch 22, the capacity switching valve 23, the blower motor 31 and the indoor/outdoor air switching valve 32 are controlled by output signals of the engine ECU 99 with an engine malfunction indication lamp 17 and the air conditioner malfunction indication lamp 49 also being controlled by the engine ECU 99.

While the air conditioner control unit is installed inside the engine ECU 99 in the same way as the engine control unit to make malfunction detection signal receipt and generation simple, it can also be in a separate ECU if there are no obstacles in the input information interface.

Figures 2, 2A:
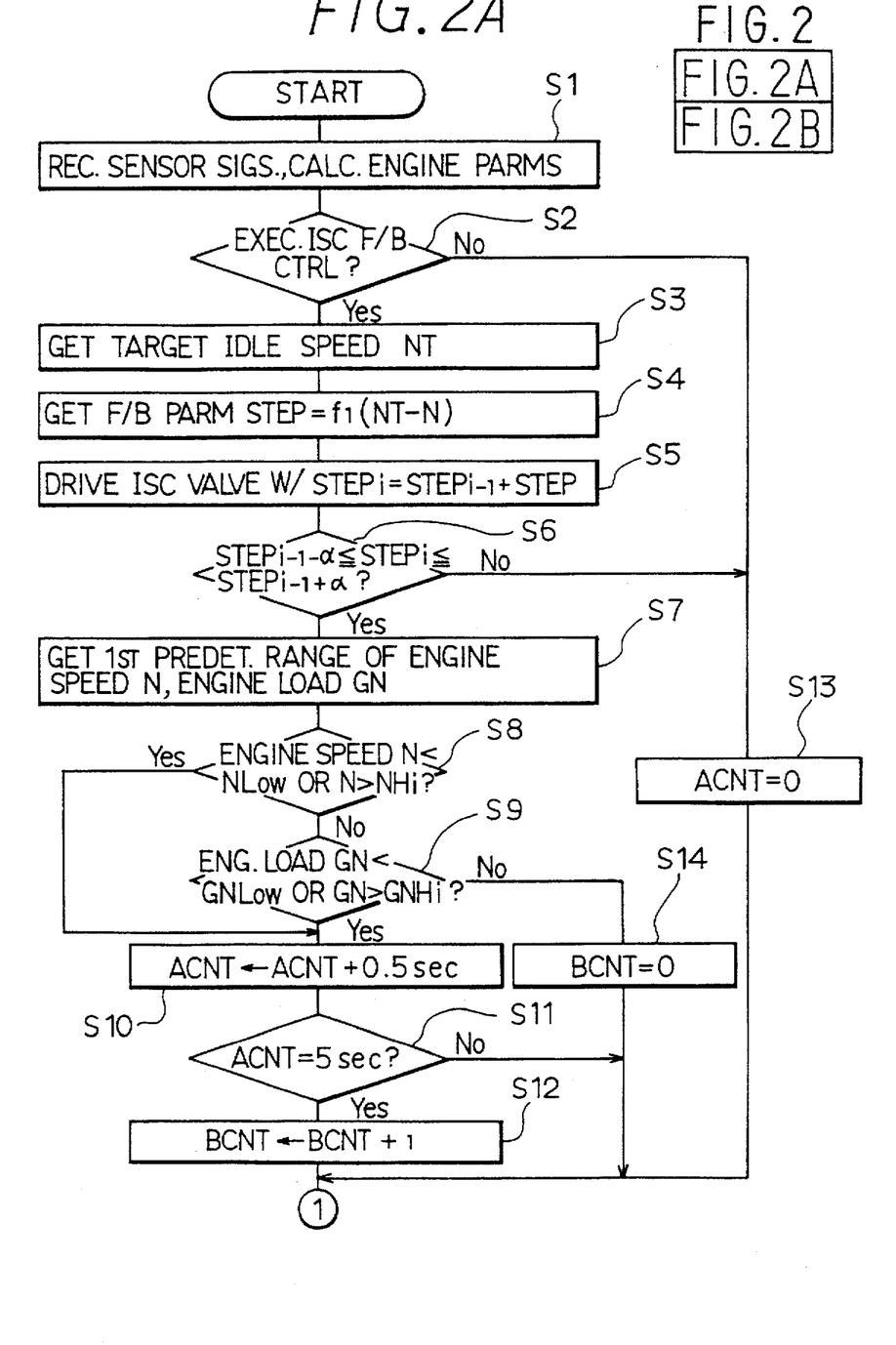
FIGS. 2, 2A and 2B show a flowchart executed in an engine control unit in the first embodiment.
Figure 2B:
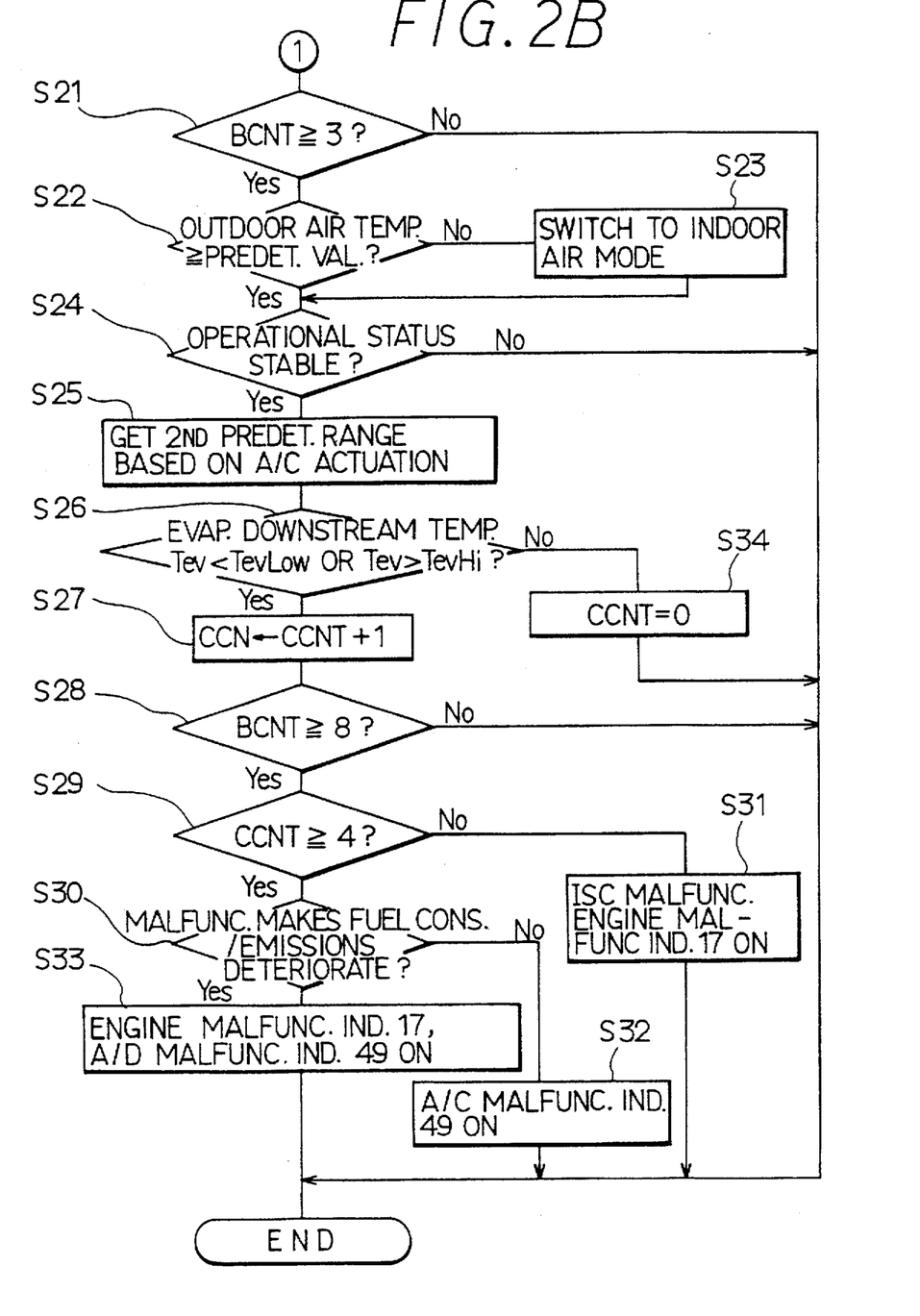

Next, the operation of the first embodiment as processed by the engine ECU 99 is explained using FIGS. 2A and 2B.

Step S1 receives measurement signals from the air flow meter 2, the throttle sensor 5, the rotation angle sensor 11, the coolant temperature sensor 13 and the vehicular speed sensor 14, and computes an intake air volume Q, a throttle aperture T, an engine speed N, an engine temperature W and a vehicular speed S which are used in controlling the engine speed to a target speed when the vehicle is at an idling stop.

Step S2 determines if ISC feedback control is to be executed or not. In the present embodiment, ISC feedback control is executed when the engine is in an after warming-up state, which is done after determining whether the engine is in a warming-up state or the after warming-up state based on the engine temperature W, and when the throttle is fully closed with the vehicle at a stop.

Step S3 computes the idle target speed based on an input state of the auxiliary device. For example, when computing the target speed NT, 600 rpm is added to it when the automatic transmission is in a drive range, 650 rpm is added to it when the air conditioner request signal 46 is ON and an additional 50 rpm is added to it when an electrical load signal 16 such as light illumination is ON.

Figure 3:
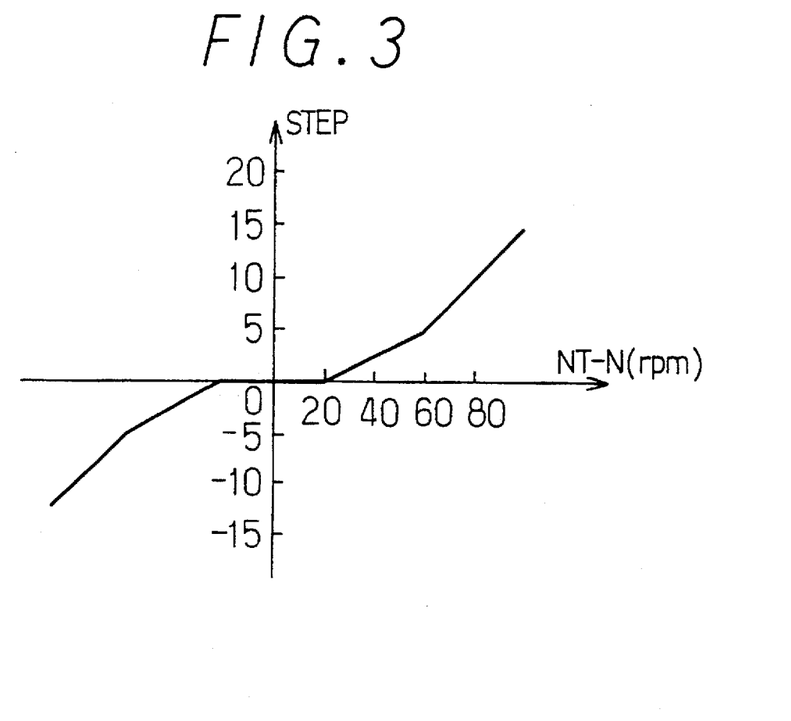
FIG. 3 is a map for computing a feedback control amount of an ISC valve in the first embodiment.

Step S4 computes a bypass air volume (a feedback control amount STEP of the ISC valve), which is for making the engine speed converge to a target speed NT based on a difference between the engine speed N during idling and the target speed NT, following a map shown in FIG. 3. Step S5 drives ISC valve 6 based on control amount $STEP_i$ of the ISC valve 6.

Based on a present ISC control amount $STEP_i$ and a previous ISC control amount $STEP_{i-1}$, step S6 determines if engine rotation has stabilized or not using the following equation (1).

$$STEP_{i-1} - \alpha \leq STEP_i \leq STEP_{i+1} + \alpha \qquad (1)$$

When step S6 gives a negative output, control goes to step S13 which resets counter ACNT explained later, which is for measuring the time duration of an abnormality, to 0 and thus finishes the process of FIG. 2.

If step S6 gives a positive output, step S7 sets the first predetermined range based on the engine operational status. In the present embodiment, engine speed N and engine load GN (inlet air volume per engine rotation) are used as engine operational parameters. As shown in TABLE I below, as the first predetermined range of the engine speed N, a proper engine speed range is set according to the driving condition of the air conditioner, the shift position and the electrical load. Also, as the first predetermined range of the engine load, as shown in TABLE II below, a proper engine load range is set according to the driving state of the air conditioner, the shift position and the electrical load.

TABLE I

| A/C Req. Sig. | Shift Pos. Sig. | Elec. Load Sig. | Target Rot. Speed | Upper Lim. Val. | Lower Lim. Val. |
|---|---|---|---|---|---|
| Off (A/C Off) | Drive | Off | 600 | 200 | 200 |
|  | Range | On | 650 | ↑ | ↑ |
|  | Neutral | Off | 600 | 300 | 300 |
|  | Range | On | 650 | ↑ | ↑ |
| On (A/C On), Lg. Cap. Comp. | Drive | Off | 650 | 100 | 150 |
|  |  | On | 700 | 100 | 200 |
|  | Neutral | Off | 700 | 150 | 250 |
|  |  | On | 800 | 100 | 250 |
| On (A/C On), Sm. Cap. Comp. | Drive | Off | 600 | 200 | 150 |
|  |  | On | 650 | ↑ | ↑ |
|  | Neutral | Off | 600 | 300 | 300 |
|  |  | On | 650 | ↑ | ↑ |

$NHi = x + a$,
$NLow = x - b$

TABLE II

| A/C Req. Sig. | Shift Pos. Sig. | Elec. Load Sig. | Target GN X (g/rev) | Up. Lim. a (g · rev) | Low. Lim. d (g/rev) |
|---|---|---|---|---|---|
| Off (A/C Off) | Drive | Off | 0.30 | 0.10 | 0.10 |
|  | Range | On | ↑ | ↑ | ↑ |
|  | Neutral | Off | 0.25 | 0.06 | 0.06 |
|  | Range | On | ↑ | ↑ | ↑ |
| On (A/C On), Lg. Cap. Comp. | Drive | Off | 0.42 | 0.18 | 0.10 |
|  |  | On | 0.44 | 0.20 | 0.12 |
|  | Neutral | Off | 0.36 | 0.10 | 0.10 |
|  |  | On | 0.34 | 0.10 | 0.08 |
| On (A/C On), Sm. Cap. Comp. | Drive | Off | 0.37 | 0.10 | 0.08 |
|  |  | On | 0.38 | 0.11 | 0.10 |
|  | Neutral | Off | 0.32 | 0.10 | 0.08 |
|  |  | On | 0.33 | 0.11 | 0.10 |

$GNHi = x + c$,
$GNLow = x - d$

It must be noted here that the reason for setting the first predetermined range in accordance with both the engine speed and the load is that the case when the idle speed does not converge to the target speed using ISC feedback control is considered here. While GN is used as the engine load, intake air pressure volume Q which is proportional to engine load, intake air pipe pressure P and ISC control amount $STEP_i$ can also be used for engine load range detection. In addition, other auxiliary device loads such as a neutral range of the automatic transmission device, the power generation state of the alternator and the load condition of the hydraulic pump can be considered to set individual first predetermined ranges, and by mapping such, a more precise engine load range can be detected with a high degree of accuracy.

When the engine speed does not converge to the target speed using ISC feedback control, step S8 determines if there is an abnormality based on the engine speed. If the engine speed is abnormally high or low despite the execution of ISC feedback, an abnormality is determined because emissions will deteriorate. Step S9 determines that there is an abnormality in the same way as described above when the engine load is abnormally high or low. If an abnormality is determined, control proceeds to step S10. If there is no abnormality determined, control goes to step S14 which resets BCNT.

In the above embodiment, the malfunction operation state in which emissions deteriorate is set as the idle operation state. This is because the auxiliary device load occupies the greatest share in the engine output and moreover, because the operational status is stable, malfunctions can be detected easily. Therefore, the same level of effects can be expected when detection is performed at a low cruising speed.

Steps S1–S12 are processed in the engine control unit.

In the first embodiment, because the explanation is limited to the air conditioner, which includes an air conditioning compressor, as the auxiliary device, step S21 in FIG. 2B and subsequent steps deal with the processes in the air conditioner control unit. In other words, hereinafter, a process which sets the malfunction determination level for determining if there is a malfunction in the air conditioner when the air conditioner operational parameter exceeds a second predetermined range is explained.

Step S21 determines if BCNT is no less than three or not. Here, if step S21 gives a positive output, that is, when the engine load is abnormal during several idle vehicle stoppages, detection of malfunction in the air conditioner using the air conditioner operational parameter is commenced to determine if the cause can be traced to the air conditioner or the ISC valve. This process ends when step S21 gives a negative output.

Step S22 determines if an outdoor air temperature To is no less than a predetermined temperature, for example, 10° C. If the outdoor air temperature is below 10° C., then step S23 switches the indoor/outdoor air switching valve 32 to switch to the indoor air circulation mode. This is because when the outdoor air temperature To declines during the outdoor air mode, the outdoor air temperature To becomes close to 0°–5° C., which is the evaporator downstream temperature when the air conditioner is turned and so, distinguishing between the actuation and non-actuation of the air conditioner becomes impossible.

Step S24 determines if the operational status has stabilized or not. For example, if no less than 20 seconds have passed at an idle vehicular stoppage or if no less than 20 seconds have passed since cruising at the same speed, then the operational status is determined to be stable. If the evaporator downstream temperature and the engine intake air temperature vary due to hot air flow, there is a need to wait until the temperature stabilizes.

Step S25 computes a second predetermined range in accordance with the operational state of the air conditioner. Here, the operational status detection is performed with setting the second predetermined range with any one of an engine intake air temperature Tg, outdoor air temperature To or a vehicular indoor temperature Tr as the standard which step S26 compares afterwards with the evaporator downstream temperature Tev to perform malfunction detection.

When vehicular indoor temperature has stabilized to comfortable levels due to the operation of the compressor, the evaporator downstream temperature Tev is controlled to be approximately 0°–5° C. for both indoor and outdoor air modes. However, the evaporator downstream temperature depends greatly on the evaporator intake air temperature. In other words, because the evaporator downstream temperature depends on the vehicular indoor temperature Tr in the indoor air circulation mode and on the outdoor air temperature To (≈engine intake air temperature Tg) in the outdoor air introduction mode, such temperatures are used as the basis for setting the second predetermined range as shown in TABLE III below.

TABLE III

| | | | TevHi = Y + e, TevLow = Y - f (Y ≧ 2° C.) | | |
|---|---|---|---|---|---|
| AC Req. Sig. | Blow Air Req. Sig. | Ind./Out. Sw. Sig. | Ev. Dn. Temp. °C. | Up. Lim. (°C.) | Lo. Lim. (°C.) |
| A/C Off | Off | Indoor | Tr | 3.0 | 3.0 |
| | | Outdoor | $\frac{To(SPD - Tr)}{80 - Tr}$ | | |
| | On | Indoor | Tr | 3.0 | 3.0 |
| | | Outdoor | To + 15/SPD$^2$ | | |
| A/C On, Lg. Cap. Comp. | | Indoor | Tr − 12 | 4.0 | 4.0 |
| | | Outdoor | (To + 15/ SPD$^2$) − 9 | 6.0 | 4.0 |
| A/C On, Sm. Cap. Comp. | | Indoor | Tr − 6 | 4.0 | 4.0 |
| | | Outdoor | (To − 15/ SPD$^2$) − 9 | 6.0 | 5.0 |

SPD = vehicle speed (km/h) = 1 km/h when SPD = 0
Tr = indoor air temperature, To = outdoor air temperature Furthermore, during the outdoor air introduction mode, because the evaporator downstream temperature Tev is affected by the amount of hot air flow (which increases the temperature of the intake air with the increase being around 15° C. during vehicular stoppage) which changes due to vehicular speed SPD, vehicular speed compensation is also performed. It must be noted here that in an inexpensive air conditioning system which does not have vehicular indoor temperature Tr and outdoor temperature sensor To sensors, malfunction detection is possible even if the second predetermined range is set based only on the engine intake air temperature Tg.

With the above line of thinking, based on the actuation/ non-actuation of the air conditioner, indoor air circulation/ outdoor air introduction modes, and the vehicular speed, the proper operational range of the air conditioner is set following TABLE III.

Based on the evaporator downstream temperature, step S26 determines that there is a malfunction in the air conditioner when the operational status of the air conditioner is out of the proper operational range, and so, step S27 increments the number of malfunctions that have been determined. Here, when the evaporator downstream temperature is within the proper operational range, control proceeds to step S34 which clears CCNT and thus, the present process ends.

In steps S28, S29, when malfunctions of the operational state and malfunctions of the air conditioner both number no less than the predetermined limits, it is concluded that the air conditioner has a malfunction. If only the number of malfunction judgments of the ISC valve malfunction becomes no less than a predetermined limit, then step S31 determines that there is a malfunction in the ISC valve. It must be noted here that when a malfunction in the engine operational parameters is determined during cruising and not during vehicular stoppage, because the ISC valve is in a non-controlled state, then the malfunction is concluded not to be an ISC valve malfunction but a malfunction in the engine control system (for example, output abnormality in the air flow meter 2, suction and exhaust valve timing lag, etc. are conceivable). A malfunction becomes conclusive after a predetermined number of malfunctions are determined to prevent erroneous malfunction judgement.

Among malfunctions of the air conditioner, if the malfunctions are malfunctions such as a compressor operational malfunction when the air conditioner is OFF, a compressor lock malfunction when the air conditioner is ON and the like, because there is a possibility for emissions or fuel consumption to deteriorate or for the driving belt to be damaged, step S30 determines that there is a serious vehicular malfunction, and when the engine speed and the engine load exceed second predetermined values, step S33 displays both engine malfunction and air conditioner malfunction at the same time and stores the malfunction code. There are various methods of displaying malfunctions to the driver such as by illuminating warning lamps, by voice or the like; however, when the malfunction is conceived to be a serious one, a more easily recognizable method should be chosen as compared with accessory function malfunctions.

During a non-operative malfunction in the compressor when the air conditioner is in operation, because there are no deteriorations in the emission/fuel consumption and because there is only a decline in comfort due to the non-operation of the air conditioner, step S32 displays an air conditioner malfunction and stores the malfunction code.

In the first embodiment, while the evaporator downstream temperature is used for the detection of the operational malfunction in the air conditioner (steps S22–S26), such malfunction can also be detected using the coolant pressure. This is because the coolant pressure becomes a saturation pressure that can be computed from the coolant temperature (which is proportional to the outdoor air temperature) when the compressor is not in operation. Therefore, a proper second predetermined range can be set regardless of whether it is the indoor or outdoor air mode.

Moreover, because the operation/non-operation of the compressor can be detected directly in a system that has a compressor speed sensor, malfunction detection can be performed more simply.

In the first embodiment, the air flow meter 2 and the crank angle rotation sensor 11 correspond to and function as the operational parameter detection means; the ISC valve 6 corresponds to and functions as the intake air volume manipulation means; steps S3–S5 of FIG. 2A correspond to and function as the idle speed control means; the evaporator downstream temperature sensor 44, the rotation sensor 41 and the coolant pressure sensor 42 correspond to and function as the auxiliary function state detection means; steps S21–S29 of FIG. 2B correspond to and function as the auxiliary device malfunction determination means; step S30 corresponds to and functions as the malfunction degree detection means; and steps S32–S33 of FIG. 2B correspond to and function as the malfunction display means.

Hereinafter, a second embodiment is explained with reference to the accompanying drawings.

Figure 4:
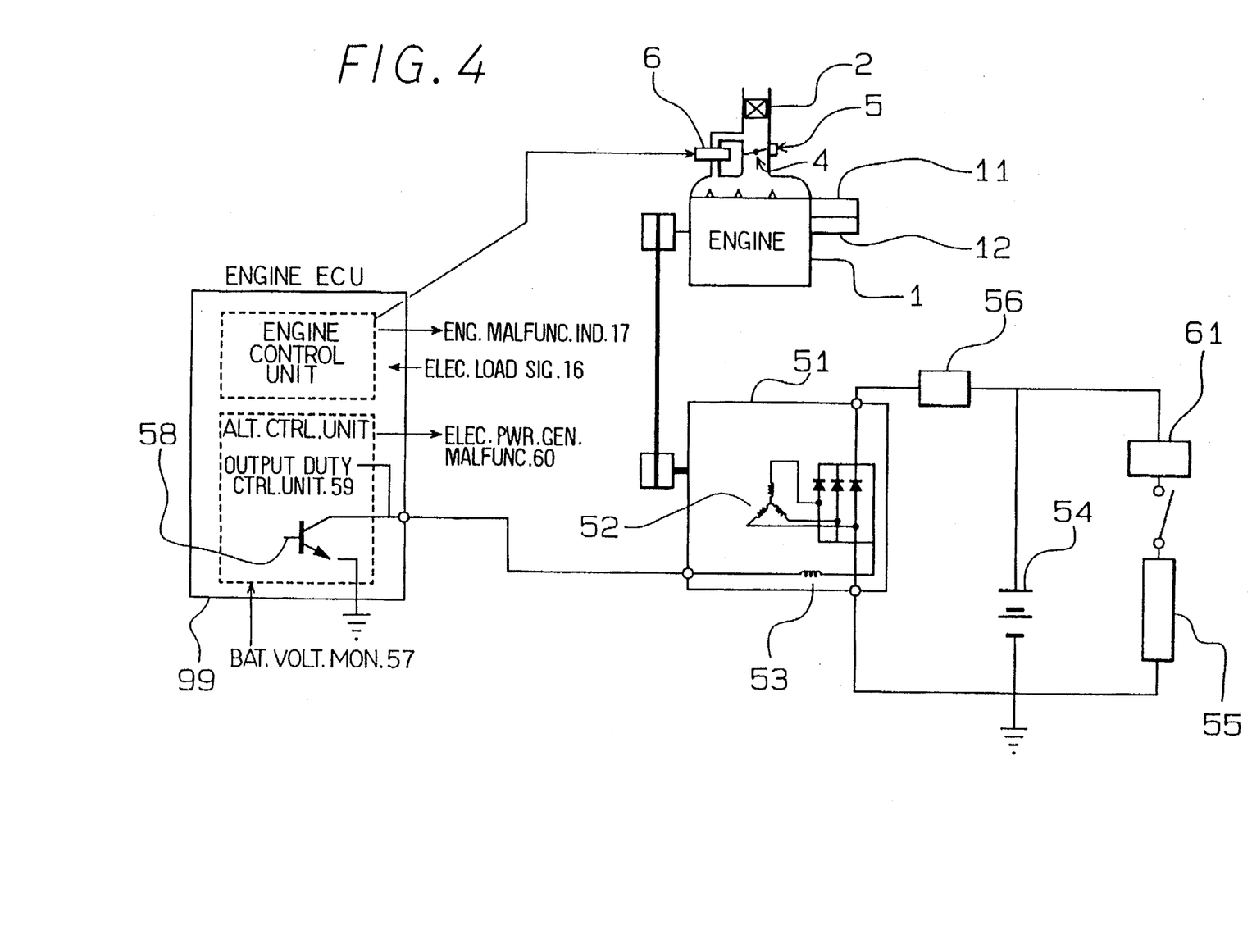
FIG. 4 is a system block diagram of a second embodiment of the present invention.

FIG. 4 shows a construction of a system used in the second embodiment.

The construction of the four cylinder internal combustion engine 1 is the same as that of the first embodiment (shown in FIG. 1), and so, its explanation is omitted here. An interior of the electric power generating alternator 51 includes a stator coil 52 which generates an electric current when magnetic field is cut through rotation and a rotor coil 53 which generates a magnetic field from the electric current. The electricity generated by the alternator 51 is stored in a battery 54.

Electric loads 55 such as lights, heaters, etc. are connected to the alternator 51 and the battery 54. An electric current detection sensor 56 detects the electric current generated by the alternator. Also, an electric load current detection sensor 61 detects electric load current. The signals detected by these sensors and battery voltage monitored by a battery voltage monitor 57 are provided to the engine ECU 99.

When the battery voltage falls below an adjustment voltage (13 V), the engine ECU 99 via its alternator control unit actuates magnetization current switching transistor 58 to supply electric current to the rotor coil 53; in other words, to generate electricity. Also, when the battery voltage exceeds the adjustment voltage, the engine ECU 99 deactuates transistor 58 to cut off the electric current of the rotor coil 53 and in this way, the engine ECU 99 has a construction which terminates the generation of electric current.

Output duty control unit 59 detects if electric current is flowing through the rotor coil 53 or not. In the present embodiment, while the alternator control unit is placed inside the engine ECU 99 like the engine control unit to simplify malfunction detection signal input and output, it can also be formed separately if there are no obstructions to the input information interface.

Figure 5:
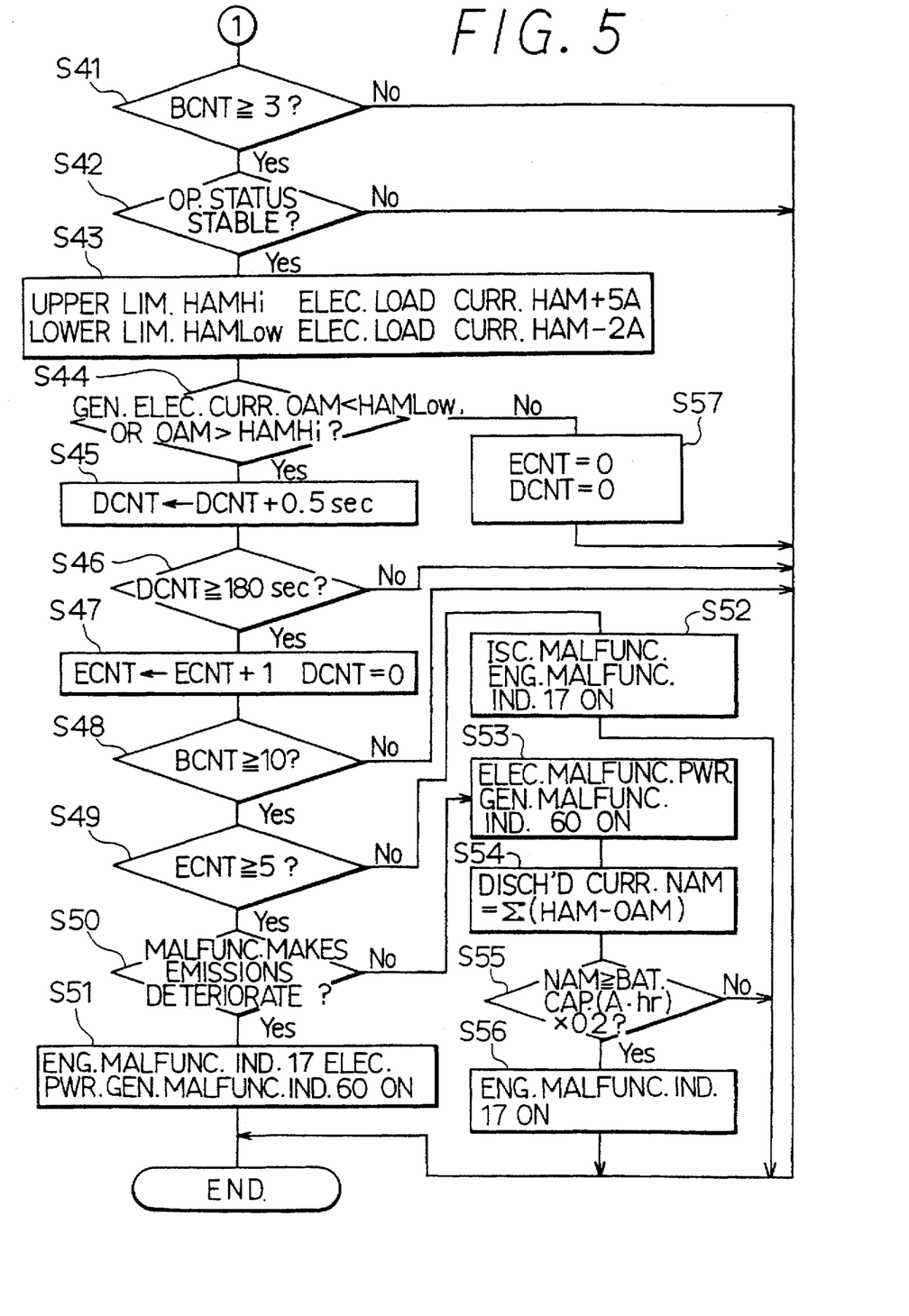
FIG. 5 is a flowchart executed by an alternator control unit in the second embodiment.

Next, FIG. 5 shows a flowchart of the second embodiment which is executed by the engine ECU 99. The explanation on the idle rotation control performed by the engine control unit is omitted here because it is the same as steps S1–S12 of the flowchart shown in FIG. 2A of the first embodiment. In the second embodiment, explanations are limited to the auxiliary device as an electric power generator which includes an electric power generating alternator.

Hereinafter, following FIG. 5, the process of step S41 and subsequent steps executed by the alternator control unit, in short, the process for setting a malfunction determination level for determining if there is a malfunction in the electric power generator when the operational parameters of the alternator exceed the second predetermined range is explained.

Step S41 determines if BCNT is no less than three or not. Here, if step S41 gives a positive output, in other words, if there is an abnormality in the engine load during several idle vehicular stoppages, then detection of malfunction in the electric power generator starts using the electric power generator operational parameters to determine if the cause lies with the electric power generator or with the ISC valve. Here, it must be noted that this process stops when step S41 gives a negative output.

Step S42 checks if the operational state has stabilized or not. For example, step S42 determines that the operating state is stable when idle vehicular stoppage continues for no less than five seconds or when the engine speed during cruising remains constant for no less than two seconds. Because the generated electric current depends on the alternator speed, in other words, on the engine speed, there is a need to wait until the generated electric current stabilizes.

Figure 6:
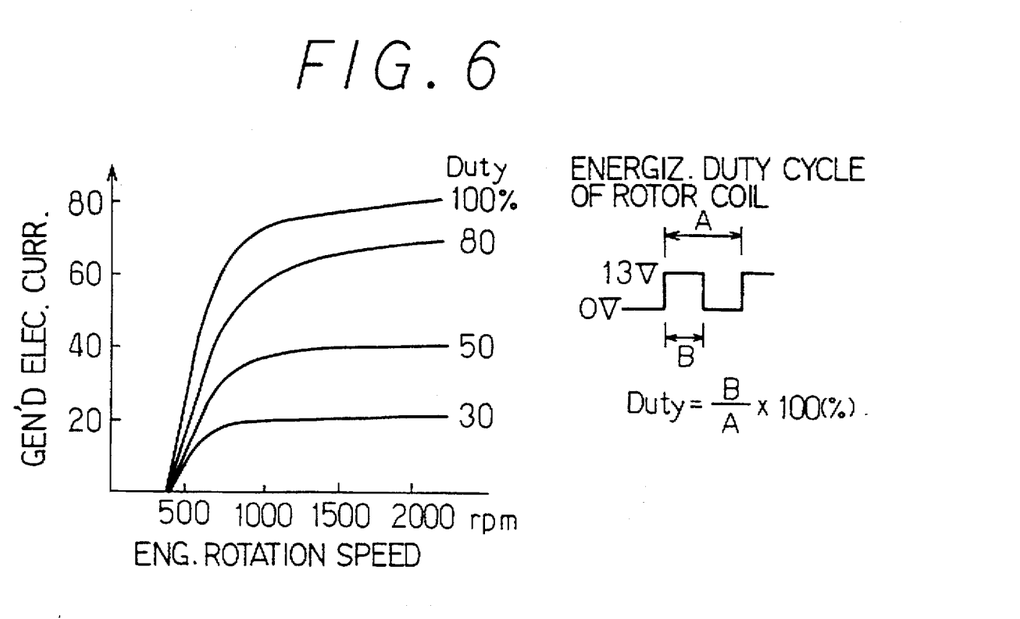
FIG. 6 is a map for computing alternator-generated electric current from an energizing time of a rotor coil and engine speed in the second embodiment.

Step S43 sets the second predetermined range based on the electric power generation operation state. Here, during the operational state detection, the second predetermined range is set based on the electrical load current HAM and malfunction detection is executed based on the alternator-generated electric current OAM. When the battery is fully charged with electric power, the alternator generated electric current becomes equal to the load electric current. It must be noted here that in a low-cost alternator system that has no sensors for detecting generated electric current and load electric current, the generated electric current is estimated from the output DUTY to the stator coil and the engine speed using the map shown in FIG. 6 while the electric current consumed by the electrical load is estimated using the ON/OFF states of the electrical load signal with malfunctions being detectable even when the second predetermined range is determined as shown in TABLE IV below.

TABLE IV

| $Y_1$ | $Y_2$ Ind. On | | $Y_3$ Blow Motor Drive | | | $Y_3$ Defog On | $Y_4$ Brake On |
| --- | --- | --- | --- | --- | --- | --- | --- |
| Eng. Op. Hd. Lmp | Hd. Lmp | Sm. Lmp | Hi Mode | Mid Mode | Low Mode | | |
| 8 A | 9 A | 6 A | 30 A | | 15 A | | |

HAMHi = Y + 7 A,
HAMLow = Y − 4 A (Y = $Y_1$ + $Y_2$ + ... $Y_n$)
SPD = vehicle speed (km/h) = 1 km/h when SPD = 0
Tr = indoor air temperature,
To = outdoor air temperature Step S45 measures the elapsed time after it is determined from the generated electric current that the electric power generator is out of a normal operating range. Moreover, if step S46 determines that such elapsed time is no less than a predetermined amount of time (for example, 180 sec.), then it is determined that the operational state is a malfunction of the electric power generator and step S47 increments the number of determined malfunctions. It must be noted here that if step S44 gives a negative output, BCNT and ECNT are reset and this process ends.

Steps S48 and S49 conclude that there is a malfunction in the electric power generator when both malfunctions in the driving state and malfunctions in the electric power generator become no less than the predetermined limits. Step S52 concludes that there is an ISC valve malfunction when malfunctions in the engine operational parameter become no less than a predetermined number. It must be noted here that a malfunction becomes conclusive after several malfunction judgements to prevent erroneous detection.

If the malfunction in the electric power generator is an operational malfunction in which the alternator produces excessive electric power (the causes can be energization malfunction of the transistor 58, disconnection of the battery voltage monitor 57), such malfunction is considered a serious vehicular malfunction because emissions and fuel consumption might deteriorate, and so, step S51 displays both engine malfunction and electric power generator malfunction at the same time and stores the malfunction code when step S50 determines that the engine speed and the engine load exceed the second predetermined range.

While there are no deteriorations in the emissions and fuel consumption with a malfunction wherein the alternator does not produce electric power (the causes can be an open malfunction in the transistor 58, disconnection of the rotor coil 53, or disconnection of the driving belt) or when there is a shortage in the amount of electric power (the causes can be wearing of the alternator brush or slipping of the driving belt), if they continue, then the battery goes dead sooner or later and so, cruising becomes impossible. Accordingly, step S53 first displays the electric power generator malfunction and at the same time, stores the malfunction code.

Step S54 computes the battery discharge current. When step S55 determines that the discharged current becomes no less than 20% of the capacity of the battery, step S56 displays an engine malfunction.

The above is the explanation of the second embodiment of the present invention. In this second embodiment, the generated electric current detection sensor 56 corresponds to and functions as the auxiliary device operational state detection means, steps S41 to S49 of FIG. 5 correspond to and function as the auxiliary device malfunction determination means, step S50 of FIG. 5 corresponds to and functions as the malfunction degree detection means, and steps S51–S53 and S56 correspond to and function as the malfunction display means.

Hereinafter, a third embodiment of the present invention is explained with reference to the drawings.

Figure 7:
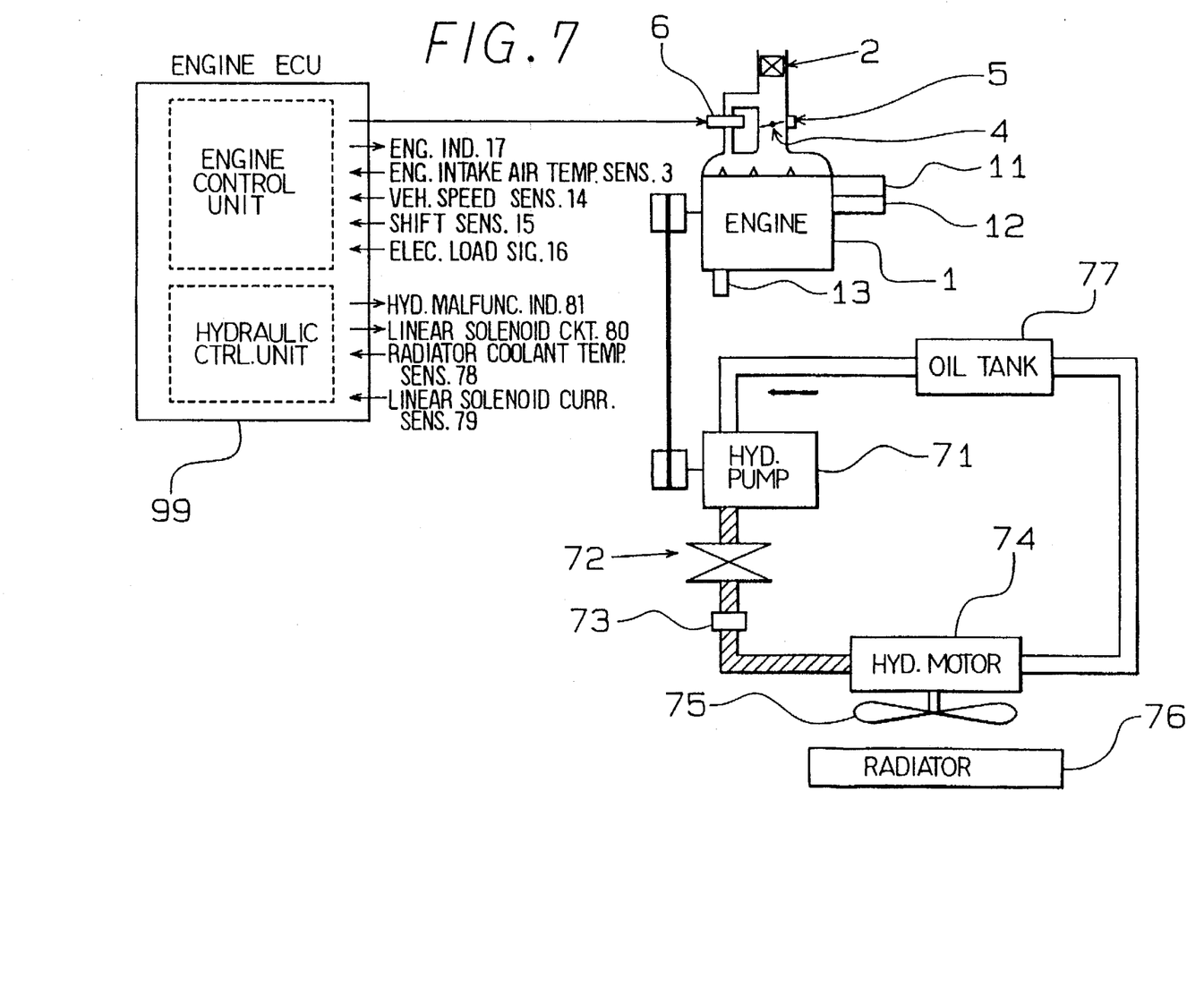
FIG. 7 is a system block diagram of a third embodiment of the present invention.

FIG. 7 shows the construction of a system used in the third embodiment.

The explanation on the construction of the four cylinder internal combustion engine 1 is omitted because it is the same as that of the first embodiment (FIG. 1).

Here, the system includes a hydraulic pump 71 which generates hydraulic pressure, a linear solenoid valve 72 which controls hydraulic pressure (which is proportional to the amount of oil flowing therethrough), a hydraulic motor 74 which converts hydraulic pressure to rotational movement, a blower fan 75 which blows air because of the rotational movement, a radiator 76 which cools engine coolant with the blown air, and an oil tank 77 which stores the circulating oil.

Moreover, a pressure sensor 73 which detects hydraulic pressure OP which is the source of driving power of the hydraulic motor 74, a coolant temperature sensor 78 which detects the temperature of the radiator coolant inside the radiator 76 and an electric current sensor 79 which measures the electric current for driving the linear solenoid valve 72 are provided with the engine ECU 99 receiving the output signals from these sensors.

Also, to vary the blower fan speed based on the engine operational state and the radiator coolant temperature, the engine ECU 99 generates a linear solenoid driving current 80, which is for controlling hydraulic pressure (which is proportional to the amount of oil flow), and lights the hydraulic unit malfunction indicator lamp 81.

Figure 8:
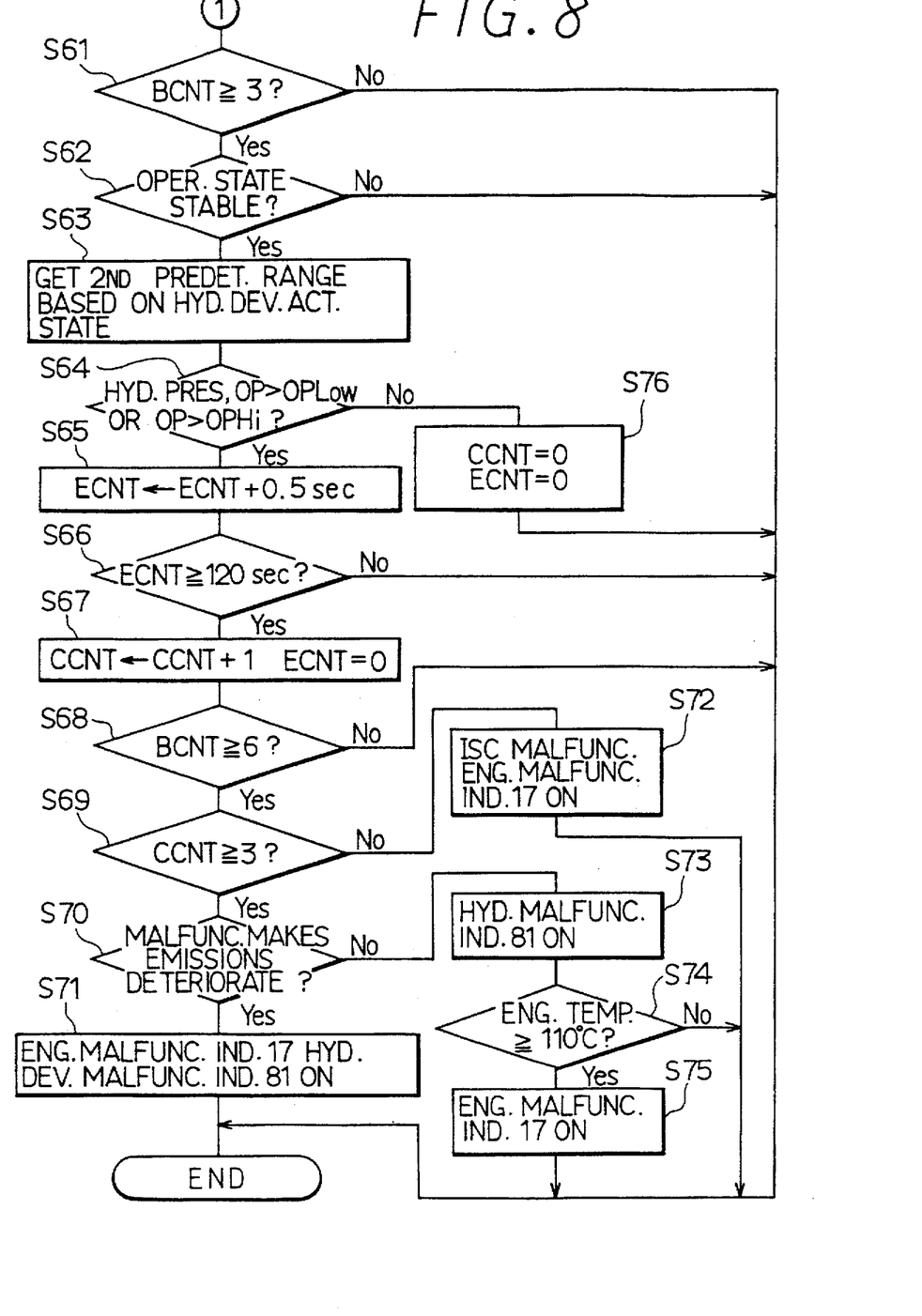
FIG. 8 is a flowchart executed by a hydraulic fan control unit in the third embodiment.

Next, the flowchart of the third embodiment which is processed by the engine ECU 99 is shown in FIG. 8. The explanation on the idle speed control executed by the engine control unit is omitted because it is the same as steps S1–S12 of the flowchart of the first embodiment shown in FIG. 2A. In the third embodiment, the explanation is limited to the auxiliary device as the hydraulic device which includes a hydraulic cooling fan.

Hereinafter, the process of steps S61 and subsequent steps which are processed by the hydraulic cooling fan control unit are explained.

In this process, a malfunction determination level is set for determining a malfunction in the hydraulic device when the operational parameters of the hydraulic cooling fan exceed the second predetermined range.

Step S61 determines if BCNT is no less than three or not. Here, if step S61 gives a positive output, in other words, when there are engine load abnormalities after several idle vehicular stoppages, detection of malfunction in the hydraulic device commences based on the hydraulic device operational parameters to determine if the cause lies with the hydraulic device or the ISC valve. It must be noted here that the present process terminates when step S62 gives a negative output.

Step S62 determines if the driving state has stabilized or not. For example, it is determined that the driving state has stabilized when idle vehicular stoppage continues for no less than five seconds or the engine speed during cruising is kept at a constant rate for no less than two seconds. Because the hydraulic pressure generated depends on the speed of the hydraulic pump, in other words, on the engine speed, there is a need to wait until the generated hydraulic pressure stabilizes. Accordingly, if the driving state does not stabilize, this process terminates while control goes next to step S63 if the driving state stabilizes.

Figure 9:
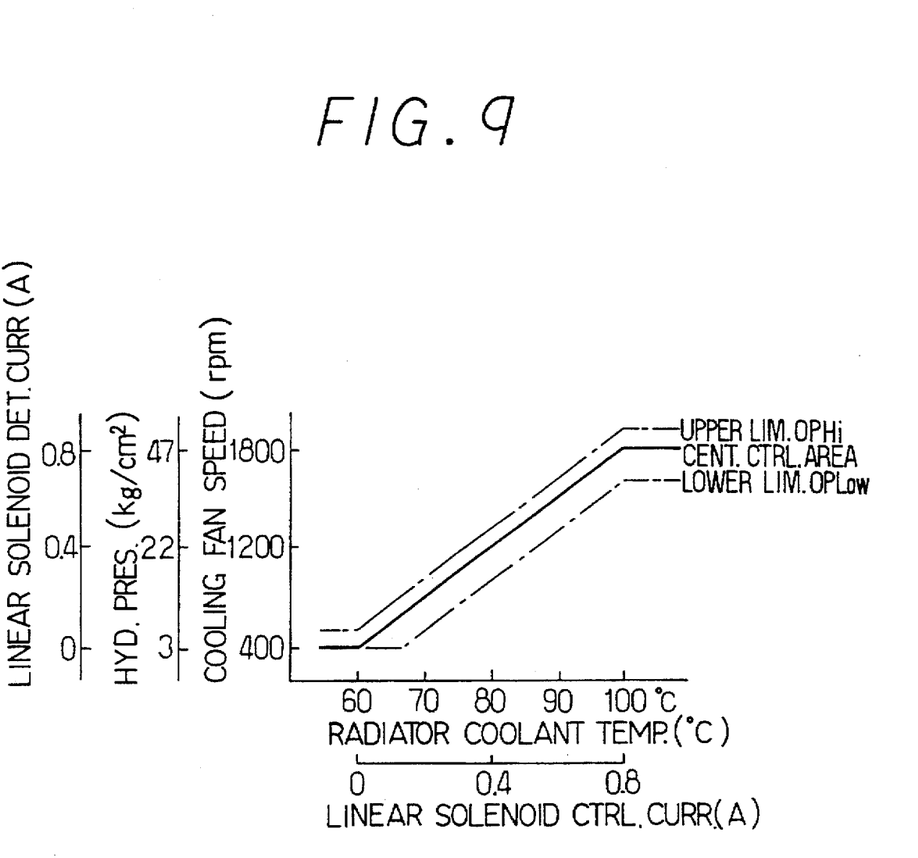
FIG. 9 is a map for computing a second predetermined range based on radiator temperature in the third embodiment.

Step S63 computes a second predetermined range in accordance with the operational state of the hydraulic pressure generating device. Here, because the radiator coolant temperature, the cooling fan speed, hydraulic pressure OP, linear solenoid valve aperture amount and linear solenoid current are all proportional to each other (radiator coolant temperature $\propto$ cooling fan speed $\propto$ hydraulic pressure OP $\propto$ linear solenoid valve aperture amount $\propto$ linear solenoid current), to detect the operational state, the radiator coolant temperature is set as the standard in setting the second predetermined range to detect malfunction using the hydraulic pressure OP (shown in FIG. 9). It must be noted here that in a low-cost hydraulic pressure cooling fan system having no sensor for detecting the hydraulic pressure generated, malfunction detection is possible by estimating the generated hydraulic pressure OP from the linear solenoid driving current.

When step S64 determines that the generated hydraulic pressure is out of the normal operating range of the hydraulic unit, step S65 measures the elapsed time and furthermore, when step S66 determines that such elapsed time is no less than 120 seconds, then step S67 determines that such operational state represents a malfunction in the hydraulic unit and increments the number of malfunctions determined. It must be noted here that when step S64 gives a negative output, step S76 clears CCNT and ECNT, and thus, this process terminates.

Steps S68 and S69 conclude that there is a malfunction in the hydraulic unit when both malfunctions in the driving state and in the hydraulic unit exceed predetermined limits. Step S72 concludes that there is a malfunction in the ISC valve when the malfunctions in the engine operational parameters become no less than a predetermined number. It must be noted here that a malfunction is made conclusive after a predetermined number of malfunction determinations to prevent erroneous detection.

Among malfunctions in the hydraulic unit, an excessive feeding pressure operational malfunction in the hydraulic pump (the causes can be opening malfunction of the linear solenoid valve 72, leaks in the hydraulic motor 74, or locking of the blower fan 75) is considered a serious vehicular malfunction because it causes deterioration in the emission and fuel consumption and so, when step S70 determines that the engine speed and the engine load exceed the second predetermined range, step S71 displays both engine and hydraulic device malfunctions at the same time and stores the malfunction code.

While the emission and fuel consumption does not deteriorate with a malfunction in which hydraulic pressure is not generated (the cause can be disconnection of the driving belt) or a lack in the hydraulic pressure (the cause can be closing malfunction of the linear solenoid valve 72 or leaks in the hydraulic pump 71), if such malfunctions continue on, overheating occurs due to the rise in the engine coolant temperature. Accordingly, step S73 displays the hydraulic device malfunction and at the same time stores the malfunction code.

When step S74 determines that the engine coolant temperature exceeds a predetermined amount (110° C.), step S75 displays an engine malfunction.

The process executed in the third embodiment has been described above. In this third embodiment, the pressure sensor 73 of FIG. 7 corresponds to and functions as the auxiliary device operational state detection means, steps S61–S69 of FIG. 8 correspond to and function as the auxiliary device malfunction determination means, step S70 of FIG. 8 corresponds to and functions as the malfunction degree detection means and steps S71–S73 and S75 correspond to and function as the malfunction display means.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A malfunction diagnosis device of an internal combustion engine controller, said diagnosis device comprising:

operational parameter estimation means for detecting an internal combustion engine operational parameter;

intake air volume manipulation means for increasing and decreasing an internal combustion engine inlet air volume;

idle rotation speed control means for making an internal combustion engine actual rotation speed converge to a target rotation speed by adjusting said intake air volume manipulation means based on a deviation between said internal combustion engine actual rotation speed and said target rotation speed during an internal combustion engine idle operating state;

an auxiliary device operational state detection means for detecting an auxiliary device operational parameter;

auxiliary device malfunction determination means for determining that said auxiliary device has a malfunction when said internal combustion engine operational parameter is out of a first predetermined range and said auxiliary device operational parameter is out of a second predetermined range; and malfunction degree detection means for determining said auxiliary device malfunction is a malfunction which aggravates emissions or fuel consumption after said auxiliary device malfunction determination means determines said auxiliary device malfunction.

2. A malfunction diagnosis device of an internal combustion engine controller according to claim 1, said diagnosis device further comprising:

malfunction display means for displaying a malfunction in accordance with a malfunction condition determined by said malfunction degree detection means.

3. A malfunction diagnosis device of an internal combustion engine controller according to claim 1, wherein:

said auxiliary device is an electric power generator, said auxiliary device operational state detection means is a means for detecting an operational parameter of said electric power generator, and said auxiliary device malfunction determination means includes a means for determining that there is a malfunction in said electric power generator when an engine operational parameter is out of a first predetermined range and said electric power generator operational parameter is out of a second predetermined range.

4. A malfunction diagnosis device of an internal combustion engine controller according to claim 3, wherein said auxiliary device operational state detection means includes means for detecting electric current generated by said electric power generator as said electric power generator operational parameter.

5. A malfunction diagnosis device of an internal combustion engine controller according to claim 4, said diagnosis device further comprising electric load current detection means for detecting electric load current, wherein said auxiliary device malfunction determination means includes means for setting said second predetermined range based on said electric load current.

6. A malfunction diagnosis device of an internal combustion engine controller according to claim 4, wherein said auxiliary device malfunction determination means determines during an idle state that there is an ISC malfunction if said auxiliary device operational parameter is within a second predetermined range when said engine operational parameter is out of a first predetermined range, and determines that there is an engine control malfunction during cruising if the operational parameter of said auxiliary device is within a second predetermined range when said engine operational parameter is out of a first predetermined range.

7. A malfunction diagnosis device of an internal combustion engine controller according to claim 3, wherein said auxiliary device malfunction determination means determines during an idle state that there is an ISC malfunction if said auxiliary device operational parameter is within a second predetermined range when said engine operational parameter is out of a first predetermined range, and determines that there is an engine control malfunction during cruising if the operational parameter of said auxiliary device is within a second predetermined range when said engine operational parameter is out of a first predetermined range.

8. A malfunction diagnosis device of an internal combustion engine controller according to claim 1, wherein:

said auxiliary device is a hydraulic unit;

said auxiliary device operational state detection means detects an operational parameter of said hydraulic unit; and said auxiliary device malfunction determination unit includes means for determining malfunction in said hydraulic unit when said engine operational parameter is out of a first predetermined range and when said operational parameter of said hydraulic unit is out of a second predetermined range.

9. A malfunction diagnosis device of an internal combustion engine controller according to claim 8, wherein said auxiliary device operational state detection means includes means for detecting hydraulic pressure generated by said hydraulic unit as said hydraulic unit operational parameter.

10. A malfunction diagnosis device of an internal combustion engine controller according to claim 9, wherein said auxiliary device malfunction determination means includes means for setting said second predetermined range based on radiator coolant temperature.

11. A malfunction diagnosis device of an internal combustion engine controller according to claim 8, wherein said auxiliary device malfunction determination means determines during an idle state that there is an ISC malfunction if said auxiliary device operational parameter is within a second predetermined range when said engine operational parameter is out of a first predetermined range, and determines that there is an engine control malfunction during cruising if the operational parameter of said auxiliary device is within a second predetermined range when said engine operational parameter is out of a first predetermined range.

12. A malfunction diagnosis device of an internal combustion engine controller according to claim 1, wherein said auxiliary device malfunction determination means determines during an idle state that there is an ISC malfunction if said auxiliary device operational parameter is within a second predetermined range when said engine operational parameter is out of a first predetermined range, and determines that there is an engine control malfunction during cruising if the operational parameter of said auxiliary device is within a second predetermined range when said engine operational parameter is out of a first predetermined range.

13. A malfunction diagnosis device according to claim 1, wherein said internal combustion engine operational parameter being out of said first predetermined range is indicative of an abnormality.

14. A malfunction diagnosis device of an internal combustion engine controller, said diagnosis device comprising:

operational parameter detection means for detecting an internal combustion engine operational parameter;

intake air volume manipulation means for increasing and decreasing an internal combustion engine inlet air volume;

idle rotation speed control means for making an internal combustion engine actual rotation speed converge to a target rotation speed by adjusting said intake air volume manipulation means based on a deviation between said internal combustion engine actual rotation speed and said target rotation speed during an internal combustion engine idle operating state;

an air conditioner driven by internal combustion engine power, said air conditioner including an evaporator which cools air using coolant latent heat;

air conditioner operational state detection means for detecting an evaporator downstream temperature as an operational parameter of said air conditioner;

air conditioner malfunction determination means for determining that said air conditioner has a malfunction during idle rotation speed control when said internal combustion engine operational parameter is out of a first predetermined range and said evaporator downstream temperature is out of a second predetermined range;

vehicular indoor temperature detection means for detecting vehicular indoor temperature;

outdoor air temperature detection means for detecting outdoor air temperature;

indoor-outdoor air switching means for switching between introducing outdoor air and circulating indoor air for air sent indoors via said evaporator, wherein said air conditioner malfunction determination means sets said second predetermined range based on outdoor air temperature when said indoor-outdoor air switching means is introducing outdoor air, and sets said second predetermined range based on vehicular indoor temperature when said indoor-outdoor air switching means is circulating indoor air.

15. A malfunction diagnosis device of an internal combustion engine controller according to claim 14, wherein said air conditioner malfunction determination means includes means for circulating indoor air using said indoor-outdoor air switching means when outdoor air temperature is no more than a predetermined value.

16. A malfunction diagnosis device of an internal combustion engine controller comprising:

operational parameter detection means for detecting an internal combustion engine operational parameter;

intake air volume manipulation means for increasing and decreasing an internal combustion engine inlet air volume;

idle rotation speed control means for making an internal combustion engine actual rotation speed converge to a target rotation speed by adjusting said intake air volume manipulation means based on a deviation between said internal combustion engine actual rotation speed and said target rotation speed during an internal combustion engine idle operating state;

an air conditioner driven by internal combustion engine power, said air conditioner including an evaporator which cools air using coolant latent heat;

air conditioner operational state detection means for detecting an evaporator downstream temperature as an operational parameter of said air conditioner;

air conditioner malfunction determination means for determining that said air conditioner has a malfunction during idle speed control when said internal combustion engine operational parameter is out of a first predetermined range and said evaporator downstream temperature is out of a second predetermined range, wherein said air conditioner malfunction determination means determines during an idle state that there is an ISC malfunction if said evaporator downstream temperature is within a second predetermined range when said engine operational parameter is out of a first predetermined range, and determines that there is an engine control malfunction during cruising if the evaporator downstream temperature is within a second predetermined range when said engine operational parameter is out of said first predetermined range.

17. A malfunction diagnosis device of an internal combustion engine controller comprising:

operational parameter detection means for detecting an internal combustion engine operational parameter;

intake air volume manipulation means for increasing and decreasing an internal combustion engine inlet air volume;

idle rotation speed control means for making an internal combustion engine actual rotation speed converge to a target rotation speed by adjusting said intake air volume manipulation means based on a deviation between said internal combustion engine actual rotation speed and said target rotation speed during an internal combustion engine idle operating state;

an air conditioner driven by internal combustion engine power, said air conditioner including a compressor for compressing a coolant;

air conditioner operational state detection means for detecting a rotation speed of said compressor as an operational parameter of said air conditioner;

air conditioner malfunction determination means for determining that said air conditioner has a malfunction during idle rotation speed control when said internal combustion engine operational parameter is out of a first predetermined range and said compressor rotation speed is out of a second predetermined range.

18. A malfunction diagnosis device of an internal combustion engine controller according to claim 17, wherein said air conditioner malfunction determination means determines during an idle state that there is an ISC malfunction if said air conditioner operational parameter is within a second predetermined range when said engine operational parameter is out of said first predetermined range, and determines that there is an engine control malfunction during cruising if the operational parameter of said air conditioner is within said second predetermined range when said engine operational parameter is out of said first predetermined range.

19. A malfunction diagnosis device of an internal combustion engine controller comprising:

operational parameter detection means for detecting an internal combustion engine operational parameter;

intake air volume manipulation means for increasing and decreasing an internal combustion engine inlet air volume;

idle rotation speed control means for making an internal combustion engine actual rotation speed converge to a target rotation speed by adjusting said intake air volume manipulation means based on a deviation between said internal combustion engine actual rotation speed and said target rotation speed during an internal combustion engine idle operating state;

an air conditioner driven by internal combustion engine power, said air conditioner including a compressor for compressing a coolant;

air conditioner operational state detection means for detecting a coolant pressure of a downstream of said compressor as an operational parameter of said air conditioner;

air conditioner malfunction determination means for determining that said air conditioner has a malfunction during idle speed control when said internal combustion engine operational parameter is out of a first predetermined range and said compressor downstream pressure is out of a second predetermined range.

20. A malfunction diagnosis device of an internal combustion engine controller according to claim 19, wherein said air conditioner malfunction determination means determines during an idle state that there is an ISC malfunction if said air conditioner operational parameter is within a second predetermined range when said engine operational parameter is out of said first predetermined range, and determines that there is an engine control malfunction during cruising if the operational parameter of said air conditioner is within said second predetermined range when said engine operational parameter is out of said first predetermined range.

21. A malfunction diagnosis device of an internal combustion engine controller operational parameter detection means for detecting an internal combustion engine operational parameter;

intake air volume manipulation means for increasing and decreasing an internal combustion engine inlet air volume;

idle rotation speed control means for making an internal combustion engine actual rotation speed converge to a target rotation speed by adjusting said intake air volume manipulation means based on a deviation between said internal combustion engine actual rotation speed and said target rotation speed during an internal combustion engine idle operating state;

an air conditioner driven by internal combustion engine power, said air conditioner including an evaporator which cools air using coolant latent heat;

air conditioner operational state detection means for detecting an operational parameter of said air conditioner;

air conditioner malfunction determination means for determining that said air conditioner has a malfunction during idle speed control when said internal combustion engine operational parameter is out of a first predetermined range and said operational parameter is out of a second predetermined range, wherein said air conditioner malfunction determination means determines during an idle state that there is an ISC malfunction if said air conditioner operational parameter is within said second predetermined range, and determines that there is an engine control malfunction during cruising if the operational parameter of said air conditioner is within said second predetermined range when said engine operational parameter is out of said first predetermined range.

* * * * *